United States Patent [19]
Safiuddin

[11] 3,983,466
[45] Sept. 28, 1976

[54] MOTOR FIELD CONTROL FOR D.C. DRIVES

[75] Inventor: Mohammed Safiuddin, N. Tonawanda, N.Y.

[73] Assignee: Westinghouse Electric Corporation, Pittsburgh, Pa.

[22] Filed: Dec. 19, 1974

[21] Appl. No.: 534,531

[52] U.S. Cl. .............................................. 318/338
[51] Int. Cl.² ........................................... H02P 5/06
[58] Field of Search .................................... 318/338

[56] References Cited
UNITED STATES PATENTS

| | | | |
|---|---|---|---|
| 3,047,729 | 7/1962 | Peterson et al. | 318/338 X |
| 3,419,777 | 12/1968 | Asseo | 318/338 |
| 3,569,809 | 1/1971 | Comer | 318/338 |
| 3,599,064 | 8/1971 | Friedman | 318/338 |

*Primary Examiner*—B. Dobeck
*Attorney, Agent, or Firm*—James J. Wood

[57] ABSTRACT

A motor field control for d.c. drives, for regulating the speed in response to an input reference signal $E_{in}$. A first operational amplifier is arranged as a ramp generator to receive the input command $E_{in}$ and deliver an output $E_1$, having a maximum magnitude equal to $E_F$. A potentiometer having a sliding contact is connected in the output of the first operational amplifier, the potential of the sliding contact with respect to ground defining an attenuation potential $-\alpha E_1$. The factor $\alpha$ is adjustable between $0 \ldots n$ to include both fractional as well as whole numbered values. A second operational amplifier is arranged to sum three inputs: $-E_F$, $E_{in}$ and $-\alpha E_1$ and deliver an output $E_2$ for controlling the field flux beyond base speed.

$$E_2 = E_F - E_{in} + \alpha E_1$$

The simple selection of the magnitude for the attenuation factor $\alpha$ determines the crossover point between armature voltage control and field flux control for the d.c. motor.

6 Claims, 5 Drawing Figures

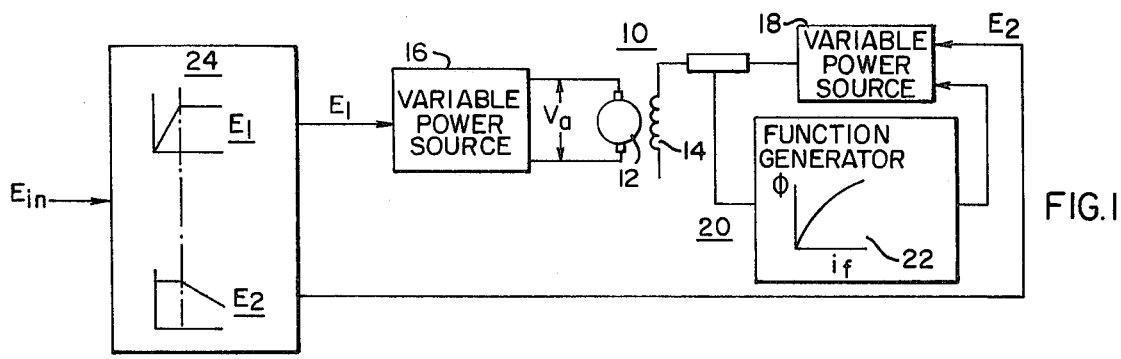
FIG.1
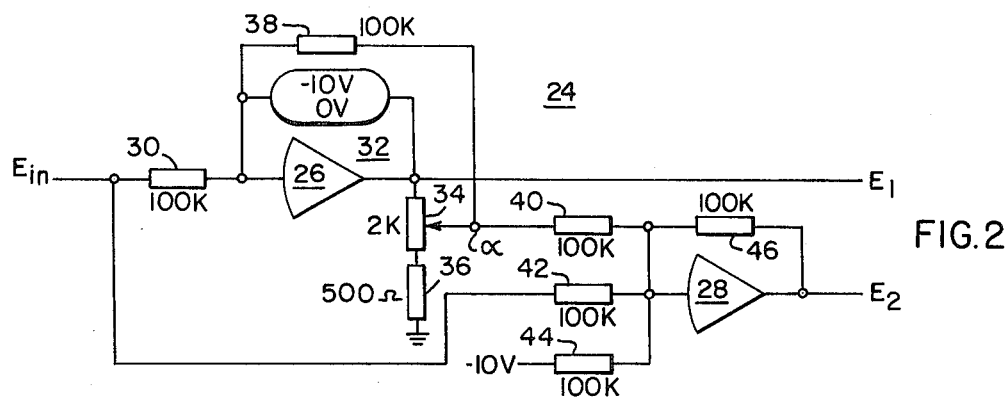
FIG.2
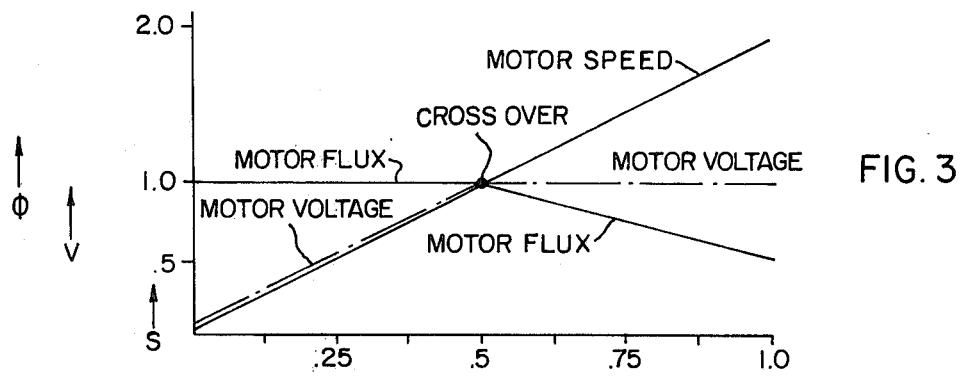
FIG.3
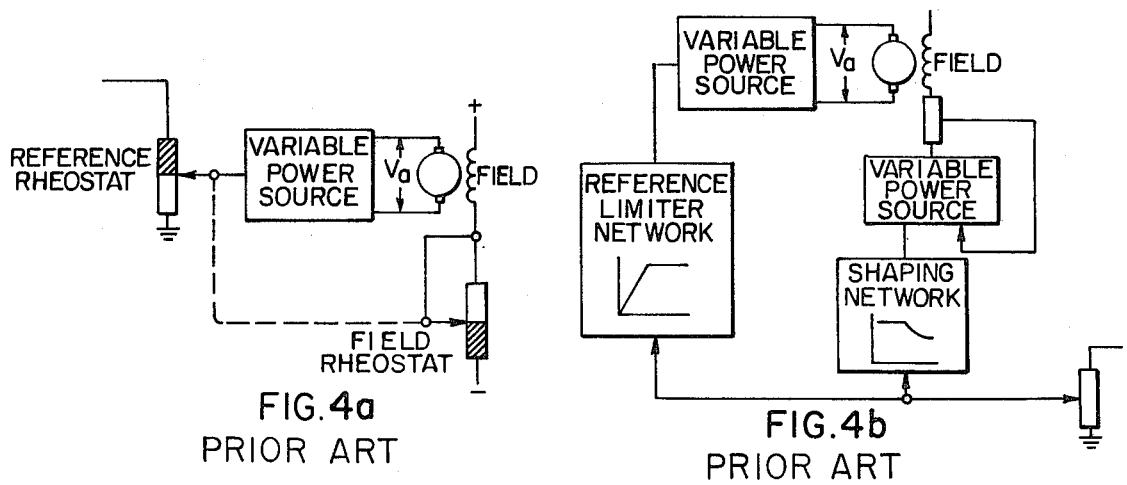
FIG.4a PRIOR ART
FIG.4b PRIOR ART

MOTOR FIELD CONTROL FOR D.C. DRIVES

BACKGROUND OF THE INVENTION

The speed of any d.c. motor can be altered by a change in any of the variables in the fundamental speed equation:

$$S = k \frac{Va - IaRa}{\phi}$$

where
- $S$ = the speed
- $k$ = a constant of proportionality
- $Va$ = the armature voltage
- $Ia$ = the armature current
- $Ra$ = the armature resistance
- $\phi$ = the flux In many applications such as in the operation of d.c. motors in rolling mills, it is the practice to control the armature voltage from standstill up to base speed, the field flux being held substantially constant, and then increasing the speed beyond base speed by field weakening, i.e. field flux control.

Prior art techniques for accomplishing these objectives are depicted in FIGS. 4A and 4B. In the FIG. 4A a tandem arrangement is utilized using cooperating reference and field rheostats. The reference rheostat has a portion shorted out (as indicated by the cross hatched section) as does a complementary section on the field rheostat. The displacements of the respective wipers are such that when one wiper is contacting a shorted section, the other wiper is actively changing the effective ohmic magnitude in the circuit in which it operates. Thus the reference signal to control the variable power source increases up to some magnitude, and then the field rheostat cuts in additional resistance to decrease the field current and hence the field flux for the motor.

In FIG. 4B separate reference limiter and shaping networks provide motor armature and field flux controls respectively.

SUMMARY OF THE INVENTION

A d.c. motor control circuitry is provided for regulating the motor speed in response to a command signal $E_{in}$. Means are arranged for receiving the command signal $E_{in}$ and for delivering a ramp signal $E_1$ having a maximum absolute magnitude equal to $E_F$, for controlling the motor armature voltage up to base speed. Attenuation means are connected to the output of the motor armature voltage control means to receive said signal $E_1$ and deliver an attenuated signal $-\alpha E_1$, the factor $\alpha$ being selectable in the range (0 ... n) including fractional numbers. Summation means are provided for summing $-E_F$, $E_{in}$ and $-\alpha E_1$ to deliver an output $E_2 = E_F - E_{in} + \alpha E_1$, the signal $E_2$ being utilized to control the field flux beyond the base speed of the motor. The selection of the factor $\alpha$ determines the crossover point between armature voltage control and field flux control in speed regulation for the motor.

BRIEF DESCRIPTION OF THE DRAWINGS

FIG. 1 is a block diagram of the d.c. motor speed control apparatus depicting the role of the motor control circuitry of the invention in the overall operation;

FIG. 2 is an electrical schematic showing the d.c. motor control circuitry in accordance with the invention;

FIG. 3 is a diagram showing the effect of the selection of the attenuation factor $\alpha$ on the crossover point between armature voltage control and field flux control; and FIGS. 4A and 4B are schematics showing two prior art techniques for providing armature voltage control and field flux controls for d.c. motor speed regulation.

DESCRIPTION OF THE PREFERRED EMBODIMENT

Referring now to the system block diagram shown in FIG. 1, a d.c. motor indicated generally at 10, comprises an armature 12 and a field 14. The armature voltage $Va$ is supplied by means of a variable d.c. power source 16 under the control of a ramp signal $E_1$. The current $i_f$ through the field 14 is supplied by a variable power source 18 which is under the control of field flux control signal $E_2$. Since the variable power source 18 controls current rather than flux, the feedback path indicated generally at 20 includes a function generator 22 which relates to field flux $\phi$ to field current $i_f$ (This relationship is the saturation curve of the machine). The input command signal $E_{in}$ is processed by the d.c. motor control circuit indicated generally at 24 to provide $E_1$ and $E_2$.

The controller circuitry 24 is shown in greater detail in FIG. 2. The input command signal $E_{in}$ is applied to a first operational amplifier indicated generally at 26 and a second operational amplifier indicated generally at 28.

The first operational amplifier 26 comprises an input resistor 30, a feedback network indicated generally and symbolically at 32 to clamp the output at a fixed potential $E_F$, i.e. $-10v$. A potentiometer 34 and a fixed resistor 36 are connected at the output of amplifier 26. The position of the sliding contact of the potentiometer (which determines the attenuation factor $\alpha$) is connected to the input of amplifier 26 through resistor 38. The resistor 38, the feedback resistor for amplifier 26, is connected to the wiper of potetiometer 34 such that the output input relationship $F_1/E_{in}$ is controllable by the factor $\alpha$. Feedback network 32 provides the limiting means for the output $E_1$, at the prescribed level for example $-10v$.

The second operational amplifier 28 comprises input resistors 40, 42 and 44 and feedback resistor 46. The input resistor 40 is connected to the sliding contact of potentiometer 34, to receive $-\alpha E_1$ as an input, resistor 42 is connected to $E_{in}$, and the third resistor 44 is connected to a source of fixed potential $E_F$ which in this practical embodiment is $-10v$ (In contemplation of this invention, the magnitude of the potential $-E_F$ is the same as the magnitude of the clamping potential for the first operational amplifier 26).

Referring now to the diagram of FIG. 3, the crossover point occurs at $\alpha = 0.5$.

In the practical embodiment:

$$\alpha = \frac{\text{resistance of 36} + 750 \text{ ohms of potentiometer 34}}{\text{resistance of 36} + \text{total ohmic magnitude of resistor 34}} \quad (1)$$

$$= \frac{500 \text{ ohms} + 750 \text{ ohms}}{500 \text{ ohms} + 2000 \text{ ohms}}$$

$$= .5$$

The mathematical relationships that describe the circuit of FIG. 2 are as follows:

$$E_1 = \frac{-E_{in}}{\alpha} \text{ for all } E_{in} \leq E_F \quad (2)$$

$E_1 = E_F$ for all $E_{in} > E_F$
where $\alpha$ = the voltage attenuation factor $$E_2 = E_F - E_{in} + \alpha E_1 \quad (3)$$

$E_2 = E_{in} + E_F (1+\alpha)$ for all $E_{in} > E_F$

For all $E_{in} \leq E_F \quad E_2 = +E_F$

In the practical embodiment $E_F = /10v/$

Thus with a single adjustment of the potentiometer 34, the attenuation factor $\alpha$ is selected and the crossover point between armature voltage control and field flux control is electrically defined.

I claim:

1. D.C. motor control circuitry for regulating the speed in response to an input command signal $E_{in}$, by the control of motor armature voltage and field flux intensity respectively, comprising:
   a. means for receiving said command signal $E_{in}$ as an input, and for delivering a ramp signal $E_1$ having a maximum absolute magnitude equal to $E_F$, for controlling the motor armature voltage up to base speed;
   b. means for potential attenuation, connected to the output of said motor armature voltage control means to receive said signal $E_1$ and for delivering a signal $-\alpha E_1$ the factor $\alpha$ being adjustable between $(0...n)$;
   c. means for summing three inputs: a first input connected to a source of potential $-E_F$, a second input connected to receive said signal $E_{in}$, and a third input connected to receive said attenuation signal $-\alpha E_1$, said summation means delivering an output $E_2$ for field flux control beyond base speed, where $E_2 = E_F - E_{in} + \alpha E_1$, whereby the selection of the factor $\alpha$ determines the cross-over point between motor armature voltage and field flux speed controls.

2. D.C. motor control circuitry for regulating the speed in response to an input command signal $E_{in}$ by the control of motor armature voltage and field flux intensity respectively, comprising:
   a. a first operational amplifier connected to receive $E_{in}$ as an input and deliver an output $E_1$ having a maximum magnitude equal to $E_F$, for controlling the motor armature voltage up to base speed;
   b. a second operational amplifier having three inputs, a first input connected to a source of potential $-E_F$, a second input connected to said command signal $E_{in}$, said second operational amplifier delivering a signal $E_2$ for controlling the field flux beyond base speed; and
   c. means coupled between said first and said second operational amplifiers to provide an attenuated potential $-\alpha E_1$ to the third input to said second operational amplifier, the factor $\alpha$ being adjustable $(0...n)$ whereby the selected magnitude for $\alpha$ determines the crossover point between armature voltage control and field flux speed control.

3. D.C. motor control circuitry according to claim 2 wherein said first operational amplifier is a ramp generator with said output $E_1$ varying linearly between zero and said fixed potential $E_F$.

4. D.C. motor control circuitry according to claim 2 wherein
said second operational amplifier is operated as a summation amplifier with the output being $E_2 = E_F - E_{in} + \alpha E_1$.

5. D.C. motor control circuitry according to claim 2 wherein said coupling means comprises a potentiometer connected across the output of said first operational amplifier and having a sliding contact, the position of said sliding contact with respect to ground, determining the magnitude of $\alpha$.

6. D.C. motor control circuitry according to claim 2 wherein said first operational amplifier includes a feedback path which clamps the output at $E_F$ when $E_{in} \geq E_F$ whereby $$E_1 = \frac{-E_{in}}{\alpha}$$

for all $E_{in} \leq E_F$
$E_1 = -E_F$
for all $E_{in} > E_F$

* * * * *